(12) United States Patent
Christoffersson

(10) Patent No.: US 8,574,517 B2
(45) Date of Patent: Nov. 5, 2013

(54) METHOD AND DEVICE FOR SEPARATION OF RECOVERABLE MATERIAL FROM PRODUCTS CONTAINING MERCURY

(75) Inventor: Per Christoffersson, Benalmadena (ES)

(73) Assignee: Midas Investments Limited, Hong Kong (HK)

( * ) Notice: Subject to any disclaimer, the term of this patent is extended or adjusted under 35 U.S.C. 154(b) by 0 days.

(21) Appl. No.: 13/502,127

(22) PCT Filed: Oct. 19, 2010

(86) PCT No.: PCT/SE2010/051128
§ 371 (c)(1),
(2), (4) Date: Apr. 14, 2012

(87) PCT Pub. No.: WO2011/049521
PCT Pub. Date: Apr. 28, 2011

(65) Prior Publication Data
US 2012/0201729 A1    Aug. 9, 2012

(30) Foreign Application Priority Data
Oct. 19, 2009   (SE) ...................................... 0950769

(51) Int. Cl.
*C22B 3/00*   (2006.01)
(52) U.S. Cl.
USPC .......................... 423/99; 423/101; 423/594.18

(58) Field of Classification Search
USPC ....................................... 423/99, 101, 594.18
See application file for complete search history.

(56) References Cited

U.S. PATENT DOCUMENTS 3,476,552 A * 11/1969 Parks ............................. 75/431

FOREIGN PATENT DOCUMENTS

| EP | 0287540 A2 | 10/1988 |
| JP | 63156586 A | 6/1986 |
| JP | 2003045336 A | 2/2003 |
| WO | 9412281 A1 | 6/1994 |

OTHER PUBLICATIONS

International Search Report for PCT/SE2010/051128, Completed by the Swedish Patent Office on Jan. 11, 2011, 4 Pages.

* cited by examiner

*Primary Examiner* — Steven Bos
(74) *Attorney, Agent, or Firm* — Brooks Kushman P.C.

(57) ABSTRACT

Method of separating recoverable material from products containing mercury. The method including crushing products to form crushed material, mixing crushed material with a liquid which has an oxidizing agent which has been chosen from a group which sodium hypochlorite, hydrogen peroxide and chlorates, oxidizing at least a portion of metallic mercury in the products for forming mercury oxide under influence of oxidizing agent. The method further includes separating a sludge, which sludge having formed mercury oxide, from at least a portion of the liquid.

10 Claims, 2 Drawing Sheets

METHOD AND DEVICE FOR SEPARATION OF RECOVERABLE MATERIAL FROM PRODUCTS CONTAINING MERCURY

CROSS-REFERENCE TO RELATED APPLICATION

This application is the U.S. national phase of PCT Appln. No. PCT/SE1010/051128 filed on Oct. 19, 2010, which claims priority to Swedish application 0950769-0 filed on Oct. 19, 2009, the disclosures of which are incorporated in their entirety by reference herein.

FIELD OF THE INVENTION

The present invention relates to a method of separating recoverable material from products containing mercury.

The present invention also relates to a device for separating recoverable material from products containing mercury.

BACKGROUND OF THE INVENTION

Fluorescent lamps and fluorescent lamp based products, such as for example low energy lamps, sodium lamps, lamps with fuses comprising mercury and traditional mercury lamps are common today. This type of lamps often contains mercury, which is a chemical element which is both poisonous and hazardous to the environment. For example fluorescent lamps usually comprise mercury in the form of mercury vapour in order to achieve fluorescence from a so called luminescent material which is located on the inside of the tube. The luminescent material which in itself may comprise mercury is contained in the lamps and is hence needed for the lamps to emit light.

Mercury may also occur in electronic products, such as for example relays, electrical switches, thermostats and displays. For example the background lighting of LCD-screens usually comprises mercury. Measurement instruments, such as thermometers and barometers, are other examples of products that may contain mercury.

Since mercury is poisonous and hazardous to the environment it is from an environmental and health aspect desirable to recover material in used lamps of this type to an as high degree as possible and in such a manner that mercury is not spread to the surroundings.

In a known treatment process for recovering used fluorescent lamps, fluorescent lamps are crushed and treated with a solution of chemicals with the purpose of binding mercury for terminal storage. In this process metallic mercury is bound to sulphide for forming mercury sulphide. Mercury in this form is, however, very difficult to recover and will hence require complicated processes.

The mercury sulphide is therefore transported to terminal storage, while metal and glass is washed, screened and recovered in the glass, glass wool and metal industry.

SUMMARY OF THE INVENTION

An object of the present invention is to achieve a method of separating recoverable material from products containing mercury in which the above disadvantages are considerably reduced or completely eliminated.

This object is achieved by means of a method of separating recoverable material from products containing mercury, which method comprises crushing products containing mercury to form a crushed material, mixing crushed material with a liquid which contains an oxidizing agent which has been chosen from a group comprising sodium hypochlorite, hydrogen per-oxide and chlorates, oxidizing at least a portion of metallic mercury comprised in the products to form mercury oxide under influence of said oxidizing agent, and separating a sludge which contains formed mercury oxide, from at least a part of said liquid.

An advantage of this method is that metallic mercury from the crushed products is bound in a liquid in an effective manner in the form of mercury oxide, which is solid and which may be removed from the liquid for forming a solid material. Mercury, in the form of mercury oxide, may also be removed, by heating and subsequent decomposition, from a sludge comprising luminescent material from products comprising luminescent material that have been crushed, which enables a reuse of the luminescent material. The method hence means that a recoverable material can be made used of in a way which is environmentally friendly and cost efficient.

The oxidizing agent preferably comprises sodium hypochlorite. Sodium hypochlorite have among others that advantage that it is comparably cheap, and that it upon reaction with metallic mercury forms reaction products in the form of mercury oxide and sodium chloride that are comparably easy to handle.

Said liquid which contains an oxidizing agent may have a pH of more than 7. For example, the pH may be higher than 7 and lower than 12.

Said liquid which contains an oxidizing agent may preferably have a pH of 8 to 10.

Such a basic pH, i.e. a pH of more than 7; for example a pH which is higher than 7 and lower than 12; or preferably a pH which is 8 to 10, is beneficial as it may result in a more efficient formation of solid mercury oxide as compared to a liquid having an acidic pH. Further, such a basic pH may reduce the formation of unwanted mercury-chloride complexes in solution. Hence, with a pH of more than 7 of said liquid which contains an oxidizing agent, the amount of mercury oxide which may be separated and further treated may thus be increased.

A basic pH minimises or completely avoids the need for a neutralization step, in which the pH of the liquid which contains an oxidizing agent would be increased from an acidic pH to a neutral or basic pH, prior to the formation of solid mercury oxide. Accordingly, the present method may, according to one embodiment, comprise the feature of avoiding a step of increasing the pH of said liquid which contains an oxidizing agent to achieve a formation of solid mercury oxide. In accordance with one embodiment of the present method, the mercury oxide in solid form may form directly during the mixing of the crushed material with said liquid which contains an oxidizing agent, and a sludge comprising the formed solid mercury oxide may be removed from the liquid directly, without first performing an increase of the pH of said liquid which contains an oxidizing agent.

The present method may further, according to one embodiment, comprise performing all the steps of mixing crushed material with a liquid which contains an oxidizing agent which has been chosen from a group comprising sodium hypochlorite, hydrogen peroxide and chlorates, oxidizing at least a portion of metallic mercury comprised in the products to form mercury oxide under influence of said oxidizing agent, and separating a sludge which contains formed mercury oxide, from at least a part of said liquid, at a pH in said liquid which is higher than 7 and lower than 12.

Yet further, said oxidizing of at least a portion of metallic mercury and/or said separating a sludge which contains formed mercury oxide from at least a part of said liquid may take place without any pretreatment or intermittent treatment comprising neutralization and/or increasing the pH.

The pH of said liquid may be the effect of basic properties of the oxidizing agent, such as the sodium hypochlorite.

Said liquid which comprises an oxidizing agent preferably has a concentration of active chlorine that corresponds to 30-200 mg/l. The concentration of active chlorine should be at least 30 mg/l. At a concentration of active chlorine which is below 30 mg/l the oxidation of mercury will be limited and there is a risk that mercury in metallic form may accumulate. A concentration of active chlorine should be maximum 200 mg/l. At a concentration of active chlorine of more than 200 mg/l an increased corrosive effect on construction materials, such as steel, in tanks etc, will result, and also a corrosive effect on, among others, metal parts of those products, such as fluorescent lamps and LCD-displays, which are to be treated, without observing a further improved oxidation of mercury.

The liquid preferably comprises a tenside for achieving release of liquid comprising mercury oxide from crushed and washed material. Further the tenside increases the wetting capability of the liquid, which facilitates access to the crushed material. Thereby a very efficient washing of the crushed products is obtained.

Preferably a tenside chosen from a group which comprises fatty alcohol ethoxylates is used.

Preferably at least a portion of the products that contain mercury that are crushed comprises luminescent material.

The method preferably comprises, after the step of separating said sludge containing mercury oxide, heating said sludge comprising mercury oxide to a temperature of at least 500° C. for decomposition of mercury oxide to metallic mercury.

Mercury oxide has a comparably low temperature of decomposition, about 500° C. This temperature is generally lower than the temperature of decomposition for those substances that are comprised in the luminescent material itself. By heating the formed sludge metallic mercury may thereby be selectively removed from the sludge, which means that only luminescent material, which may be reused in the forming of new products, remains. Also the metallic mercury, which leaves the sludge upon heating, may be reused in this manner.

Preferably a liquid, which suitably contains said oxidizing agent, is supplied during the crushing of products. Thereby dust and mercury which are released during the crushing are captured, which contributes to a clean working environment and that a larger portion of recoverable material may be separated.

The liquid that is supplied during the crushing preferably comprises an oxidizing agent which is chosen from a group comprising sodium hypochlorite, hydrogen peroxide and chlorates, in order for oxidation of metallic mercury to start already during the crushing.

The crushed material is preferably washed in a drum, which drum rotates in a liquid tank, which comprises a liquid which contains said oxidizing agent. Thereby a very efficient washing of crushed material is achieved. The rotatable washing drum preferably has a certain inclination relative to a horizontal plan to transport crushed material simultaneously with the washing thereof. The inclination of the drum in relation to the horizontal plan may, preferably, be adjusted to achieve a desired throughput time for the crushed material in the drum.

The liquid that is supplied during the crushing may have the same properties as the liquid in the liquid tank. For example, the liquid that is supplied during the crushing may have the same pH and/or the same concentration of oxidizing agent as the liquid in the liquid tank.

The liquid that is supplied during the crushing may comprise the same oxidizing agent as the liquid in the liquid tank.

At least a portion of said liquid containing said oxidizing agent supplied at the crushing of products may be recycled from a tank in which the mixing of crushed material with a liquid which contains an oxidizing agent is performed. Such recycling is a practical way to handle the supply of the liquid at the crushing.

Make-up liquid containing oxidizing agent and water, which make-up liquid contains lower concentration of mercury than the liquid in the liquid tank, may be supplied in the crushing of products.

A further object of the present invention is to obtain a device for separating recoverable material from products containing mercury in which the above mentioned disadvantages with the known technology are considerably reduced or entirely eliminated.

This object is achieved by means of a device for separation of recoverable material from products containing mercury, which device comprises a crushing device for crushing products containing mercury, and a washing device for washing crushed material in a liquid, wherein the washing device comprises a device for supplying an oxidizing agent, which is chosen in a group which comprises sodium hypochlorite, hydrogen peroxide and chlorates, to said liquid for oxidizing at least a portion of metallic mercury comprised in the products for forming mercury oxide under influence of said oxidizing agent, and a separating device for separating a sludge, which sludge comprises formed mercury oxide, from at least a portion of said liquid.

An advantage of this device is that metallic mercury from the crushed products may be bound in an efficient manner in the liquid in the form of mercury oxide, which is solid and can be removed from the liquid for forming a solid material. Metallic mercury may be recovered, by heating the formed mercury oxide to its temperature of decomposition, in a comparably easy manner. Hence the device enables environmentally friendly and cost efficient recovering of recoverable material.

Preferably at least a portion of said products comprises both mercury and luminescent material.

The device comprises according to one embodiment a heating device for heating said sludge containing mercury oxide to a temperature of at least 500° C. for evaporation of mercury oxide.

Preferably the crushing device comprises at least one nozzle for pouring a liquid containing said oxidizing agent over the products containing mercury during the crushing of the same. Thereby dust and mercury that are released during the crushing may be captured, which contributes to a clean working environment and that a larger portion of recoverable material may be recovered. Pouring may involve, for example, spraying, streaming or sprinkling, and/or other suitable ways of applying the liquid to the crushed products. Said liquid in the washing device may have a pH of more than 7. For example the pH may be higher than 7, and lower than 12. Said liquid in the washing device may preferably have a pH of 8 to 10.

Preferably the washing device comprises a washing drum, which washing drum is arranged to rotate in a liquid tank, which is arranged to contain a liquid containing said oxidizing agent. Thereby a very efficient washing of crushed material may be obtained.

The device comprises, according to one embodiment, a measuring device for measuring, indirectly or directly, the concentration of active chlorine of the liquid of the washing device, and a dosing device for dosing oxidizing agent to the washing device in dependence of the measured concentration of active chlorine.

Further advantages and features of the invention will become apparent from the below description and the following claims.

BRIEF DESCRIPTION OF THE DRAWINGS

The invention will now be described with the help of embodiments and with reference to the enclosed drawings.

DETAILED DESCRIPTION OF PREFERRED EMBODIMENTS

Figure 1:
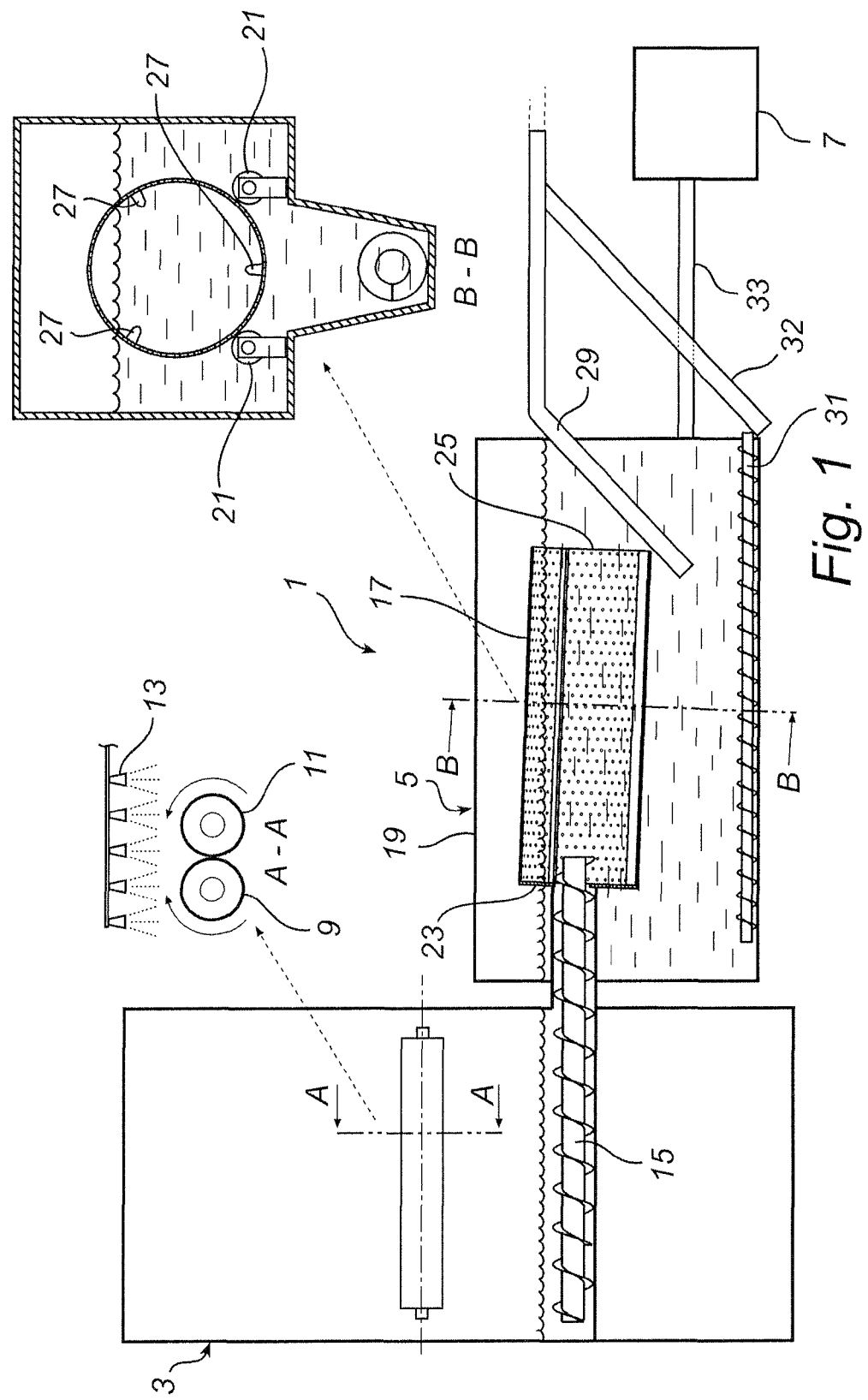
FIG. 1 illustrates, schematically, a device for separating recoverable material from products containing mercury according to a first embodiment.

FIG. 1 illustrates, schematically, a device 1 for separating recoverable material from products containing mercury, such as fluorescent lamps, low energy bulbs, displays and thermometers. The device 1 comprises a crushing device 3, a washing device 5 and a separating device 7.

The crushing device 3 comprises in this embodiment two crushing rollers 9 and 11 arranged close to each other and being rotatable, which is illustrated in the cross-section A-A in FIG. 1. In normal operation a gap of 1 cm width is formed between the rollers 9, 11. The crushing roller 11 is spring loaded and movable in the lateral direction relative to the other crushing roller 9. The spring loaded roller 11 may thereby be moved in lateral direction, in a direction away from the roller 9, if an uncrushable object enters the crushing device 3. The spring loaded roller 11 returns to its normal operating position after the uncrushable object has passed through the rollers. Depending on which material that is to be crushed also other types of crushing devices may be utilized. In case for example displays are to be crushed the crushing device may, for example, be designed as a shredding crusher, which is provided with rollers comprising teeth or grooves, such rollers crushing and tearing the products to smaller parts.

The crushing device 3 further comprises nozzles 13 for supplying liquid during the crushing, which is illustrated in the cross-section A-A in FIG. 1. The liquid supplied via the nozzles 13 has among other things the purpose of binding mercury in gaseous form and possible luminescent material that is set free in connection with the crushing, and hence combines to a larger portion of recoverable material from the crushed products being utilized. The liquid comprises, preferably, oxidizing agent, for example sodium hypochlorite, for oxidizing at least a portion of that metallic mercury which is released in convection to the crushing. At least a portion of the liquid may be recycled from the liquid tank 19 to the crushing device 3. For such a purpose there may be at least one pipe arranged between the liquid tank 19 and the crushing device 3, and being connected to for example the nozzles 13 (said at least one pipe is not illustrated), and there may be a means for pumping the liquid in the pipe from the liquid tank 19 to the crushing device 3 (said means for pumping is not illustrated). Make-up liquid containing oxidizing agent and water, which make-up liquid contains lower concentration of mercury than the liquid in the liquid tank 19, may be referred to as 'fresh liquid'. Such fresh liquid may be supplied to said at least one pipe supplying liquid to the crushing device 3, such that at least a portion of the liquid supplied to the crushing device 3 is fresh liquid. According to one embodiment all liquid supplied to the crushing device 3 may be fresh liquid. According to an alternative embodiment fresh liquid may be supplied to the liquid tank 19. It is realised that fresh liquid may be supplied to both the crushing device 3 and the liquid tank 19. The crushing device 3 further comprises a transporting device, in this case in the form of a screw conveyor 15, for transport of crushed products to the washing device 5.

The washing device 5 comprises a rotatable perforated washing drum 17 which is immersed in a liquid tank 19. The liquid tank 19 preferably comprises water, the oxidizing agent sodium hypochlorite, and tensides that lower the surface tension for achieving release of liquid which comprises oxidized mercury from crushed and washed material. The tensides hence helps the liquid to release from the crushed products before discharge from the liquid tank 19 occurs. The tensides also have the purpose of increasing the wetting capability of the liquid, which makes it possible to wash the parts of the crushed products in an efficient manner. Preferably a tenside is utilized which is chosen from the group which comprises fatty alcohol ethoxylates. The liquid level in the tank 19 is suitably such that it extends above at least half the height of the washing drum, as is best illustrated in the cross-section B-B of FIG. 1. The washing drum 17, which rests on rollers 21, may be rotated by means of a driving device, not shown. The driving device may for example comprise a belt or gear drive. Preferably the outer periphery of the washing drum 17 is provided with a gear rim which engages with a driving gear provided with gear teeth.

The washing drum 17 is open in both ends, wherein the end sections forms the inlet 23 and the outlet 25, respectively, of the drum. Feeding crushed products to the drum 17 is made by means of the screw conveyor 15, which extends into the inlet 23 of the washing drum. The washing drum 17 is oriented such that its central axis forms an angle to a horizontal plane. The drum 17 has, as seen in its longitudinal direction, hence a certain inclination downwards in the direction towards the outlet 25, which means that crushed material that has been fed into the washing drum 17 during operation of the drum 17 is transported towards the outlet 25. The inclination of the washing drum 17 may be adjusted by means of a not shown setting device. Hence the throughput time, that is the time it takes for crushed products to be transported from the inlet 23 to the outlet 25 of the washing drum 17, may be varied and adjusted to the type of products that at the moment are treated in the device 1. The inclination of the washing drum 17 may be adjusted such that throughput times of about 5-60 minutes may be achieved.

Internally the washing drum 17 is provided with agitators 27 in the form of longitudinal profiles, which is illustrated in the cross-section B-B in FIG. 1. The longitudinal profiles are intended for improving the agitation of crushed material in the drum 17 and, hence, to achieve an efficient contact between the liquid containing oxidizing agent and the crushed material.

The washing device 5 further comprises a transport belt 29 connected to the outlet 25 of the washing drum 17 for removing washed material. Washed material leaving the drum 17 ends up on the transport belt 29 and is transported to subsequent separating devices. In the lower portion of the liquid tank 19 there is a further transporting device 31 in the form of a screw conveyor, for discharging crushed products, such as for example small glass and metal pieces which have passed through the perforated washing drum 17. Furthermore there is a screw conveyor 32 connected to the transporting device 31 for transport of finely pulverized crushed material to the transporting belt 29. Hence also finely pulverized material may be transported to subsequent separating devices via the transporting belt 29.

In the lower portion of the liquid tank 19 there is a pipe 33 through which liquid containing a sludge which contains mercury oxide in solid form and luminescent material may be pumped from the liquid tank 19 to the separating device 7 by means of a not shown pump.

Figure 2:
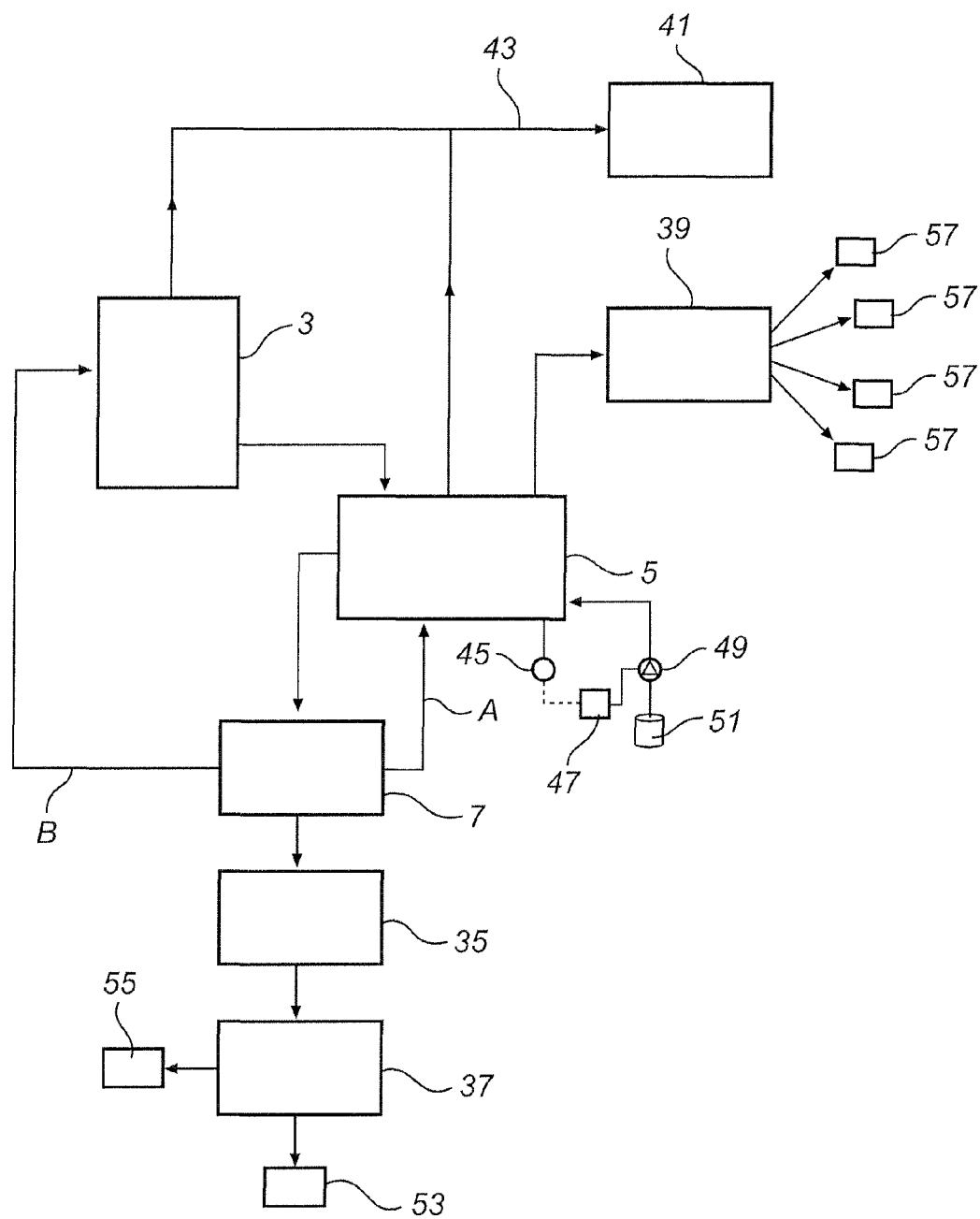
FIG. 2 illustrates, schematically, a plant for separating recoverable material from products containing mercury, which plant comprises the device illustrated in FIG. 1.

FIG. 2 illustrates, schematically, a plant for separating recoverable material from used products. In addition to the device 1 illustrated in FIG. 1 the plant comprises a chamber filter press 35 connected downstream of the separating device 7, a vacuum distilling device 37 arranged downstream of the chamber filter press 35, and equipment 39 for fractionation of washed glass and metal products and other material that is free from mercury.

The plant further comprises a filtering device 41 for filtering vapours from the crushing device 3 and the washing device 5, respectively. These vapours are transported to the filtering device 41 via a pipe system 43. The filtering device 41 preferably comprises a carbon filter, which absorbs any mercury in the vapours.

With reference to FIG. 2 a method of separating a recoverable material from products comprising mercury will now be described.

Used products comprising mercury, such as lighting products, electronic products and measurement instruments, are normally transported to the plant in collecting containers. Examples of such products are fluorescent lamps, LCD displays and thermometers. The products are emptied by means of a lifting device into the confined crushing device 3. In the crushing device 3 products are crushed between the crushing rollers 9, 11 illustrated in FIG. 1, simultaneously with liquid being supplied from nozzles 13 arranged above the crushing rollers. The liquid binds vapour and luminescent material which is released in connection with the crushing and hence combines to recoverable material being separated to a larger degree. The liquid supplied via the nozzles 13 contains preferably the oxidizing agent sodium hypochlorite in an aqueous solution with a pH of more than 7 and lower than 12 wherein oxidation of metallic mercury to mercury oxide is initiated.

Sodium hypochlorite, NaClO, reacts in an aqueous solution, hereafter named "aq", with metallic mercury, Hg, and forms solid mercury (II) oxide, HgO, and sodium chloride, NaCl, in an aqueous solution according to the following reaction:

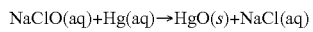

$$NaClO(aq)+Hg(aq) \rightarrow HgO(s)+NaCl(aq)$$

An advantage of sodium hypochlorite is that it is a comparably cheap and harmless oxidizing agent. At a typical pH of more than 7 and typically lower than 12 of the liquid in the liquid tank 19 HgO in solid form will precipitate already in the liquid tank 19. Thus, washing of the crushed material, oxidation of metallic mercury by NaClO, and precipitation of HgO in solid form will occur in one and the same liquid tank 19. Thus sludge already containing HgO in solid form may be removed from the tank for further treatment as described below. A further advantage is that the rest products in the form of mercury oxide and sodium chloride are comparably harmless and easy to handle.

It has been found that the amount of sodium hypochlorite in the liquid is preferably controlled in such a manner that the concentration of active chlorine in the liquid, measured according to standard ASTM D2022, is 30-200 mg/l active chlorine, more preferably 30-100 mg/l active chlorine, even more preferably 40-70 mg/l active chlorine, and most preferably 45-55 mg/l active chlorine.

The determination of the amount of active chlorine in the liquid can be made by means of a direct iodometric analytical method according to ASTM D2022. The supply of sodium hypochlorite to the liquid can for example be arranged by means of a time controlled dosing pump. The control of the chlorine content in the liquid is controlled by means of sampling and analysis by means of iodometric titration according to ASTM D2022, wherein the amount of sodium hypochlorite per unit of time which the time controlled dosing pump is to dose is adjusted depending on the analysis made.

It is also possible to utilize a method which indirectly measures the oxidation potential of the liquid. An example of such a method is measuring the redox potential of the liquid. In FIG. 2 it is illustrated how a redox meter 45 has been arranged for measuring the redox potential of the liquid of the washing device 5. A controlling device 47 receives a signal, which relates to the present redox potential of the washing device 5, from the redox meter 45 and compares this with a set point for the redox potential. The set point for the redox potential corresponds, for example, to 50 mg/l active chlorine measured according to ASTM D2022. If the measured redox potential is lower than the set point the controlling device 47 may order a pump 49 to pump, from a tank 51 which comprises a sodium hypochlorite solution, sodium hypochlorite solution to the washing device 5.

As alternative to sodium hypochlorite, NaClO, it is also possible to utilize, as oxidizing agent in the liquid, chlorates, such as sodium chlorate, $NaClO_3$, or potassium chlorate, $KClO_3$, or hydrogen peroxide, $H_2O_2$. These oxidizing agents also have the capability of efficiently forming mercury (II) oxide, HgO, from metallic mercury in the liquid.

Crushed material and liquid containing bound mercury is transported from the crushing device 3 to the washing device 5 by means of the screw conveyor 15 illustrated in FIG. 1. The crushed material is feed into the rotating washing drum 17 of the washing device 5, which drum is to more than half immersed in the water tank 19. Crushed material is thereby mixed in the drum 17 with the liquid of the liquid tank 19 and is transported towards the outlet 25 of the washing drum. The liquid level in the washing drum 17 preferably extends to at least about half the height of the drum. When the drum 17 rotates the crushed material is washed, meaning that mercury and luminescent material is liberated from, for example, glass and metal pieces. The liquid preferably comprises water with sodium hypochlorite, with the above mentioned concentrations, and preferably low foaming chlorine stable tensides. The tensides have, among other things, the purpose of increasing the wetting capability.

The required throughput time in the washing drum 17 is determined by, among other things, the type of material that is to be washed. For example it may be mentioned that a suitable throughput time for crushed fluorescent lamps is about ten minutes. The throughput time is adjustable and may be adapted to the type of products that are to be crushed. The washing drum 17 is provided with perforations through which liquid and particles of a certain size may pass. During the washing sodium hypochlorite oxidizes metallic mercury to mercury oxide in the form of fine particles which passes through the perforations of the drum 17.

The chemicals of the washing liquid decreases the vapour pressure of mercury, which decreases the risk of exposure to humans and the surrounding environment. Liquid comprising mercury oxide in the form of fine particles and luminescent material is continuously pumped from the tank 19 to the lamella separating device 7 illustrated in FIG. 2 in which a sludge comprising mercury oxide and luminescent material is separated from the liquid. Liquid from the lamella separating device 7 is returned to the liquid tank 19 and/or to the crushing device 3, illustrated by means of the arrows A and B, respectively, of FIG. 2.

Sludge from lamella separating device 7 is feed, after adding flocculating agent, to a filter chamber press 35 where the sludge is pressed for forming cakes, comprising mercury oxide and luminescent material.

To enable reuse of luminescent material in new products the mercury needs to be removed from the cakes formed in the filter chamber press 35. This may for example be made by means of a vacuum distilling device 37 where the cakes are heated. Upon heating to a temperature of about 500 C mercury (II) oxide, HgO, is decomposed and forms oxygen gas, $O_2$, and metallic mercury, Hg, in gaseous form. Thereby metallic mercury leaves the heated sludge, which means that only luminescent material, which is essentially free from mercury, or contains only small amounts of mercury, and which can be reused in producing new products, remains. This luminescent material is collected in a container 53 and is transported away for reuse. The metallic mercury, which is evaporated in gaseous form in the vacuum distilling device 37, may, for example, be captured in a condenser 55, in which the mercury vapours are brought into contact with cooled surfaces which makes the mercury condense and form liquid mercury, which is then taken care off, for example, for reuse in the production of lighting products. Also the metallic mercury, which is evaporated from the sludge upon heating, may in this form be reused.

Washed glass, metals and other material that is free from mercury is continuously removed from the liquid tank 19 with the help of the transporting belt 29 and is then sorted in various fractions, such as ferrites, aluminium, plastic and glass, in the device 39 with the help of per se known processes, such as for example sieving, magnetic separation and eddy current separation. The pure fractions of iron, aluminium, glass, plastic, etc that remain are collected in containers 57 and may be reused for production of, for example, new lighting products.

The invention claimed is:

1. A method of separating recoverable material from products containing mercury, the method comprises:

crushing products containing mercury to form a crushed material;

mixing crushed material with a liquid that contains an oxidizing agent comprising sodium hypochlorite, hydrogen peroxide or chlorates and has a pH of more than 7, wherein said liquid comprises a tenside to achieve release of the liquid containing mercury oxide from the crushed material;

oxidizing at least a portion of metallic mercury comprised in the products to form mercury oxide under influence of said oxidizing agent; and separating a sludge which contains formed mercury oxide, from at least a part of said liquid.

2. A method according to claim 1, wherein said oxidizing agent comprises sodium hypochlorite.

3. A method according to claim 1, wherein said liquid has a concentration of active chlorine which corresponds to 30-200 mg active chlorine per liter of liquid.

4. A method according to claim 1, wherein at least a portion of said products containing mercury comprises luminescent material.

5. A method according to claim 4, which comprises the step of, after said separation of said sludge containing mercury oxide, heating said sludge comprising mercury oxide to a temperature of at least 500° C. for decomposition of mercury oxide.

6. A method according to claim 1, wherein liquid containing said oxidizing agent is supplied at the crushing of products.

7. A method according to claim 6, wherein at least a portion of said liquid containing said oxidizing agent supplied at the crushing of products is recycled from a tank in which the mixing of crushed material with a liquid which contains an oxidizing agent is performed.

8. A method according to claim 1, wherein crushed material is washed in a drum, which drum rotates in a liquid tank, which contains a liquid which contains said oxidizing agent.

9. The method of claim 1, wherein the oxidizing agent used in the mixing step has a pH of 8 to 10.

10. The method of claim 1, wherein the tenside comprises fatty alcohol ethoxylates.

* * * * *